No. 665,101. Patented Jan. 1, 1901.
E. B. JONES.
VEHICLE HUB.
(Application filed Sept. 12, 1900.)
(No Model.)
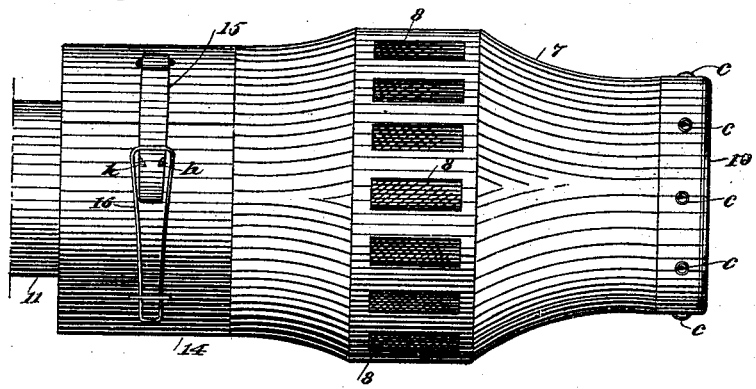
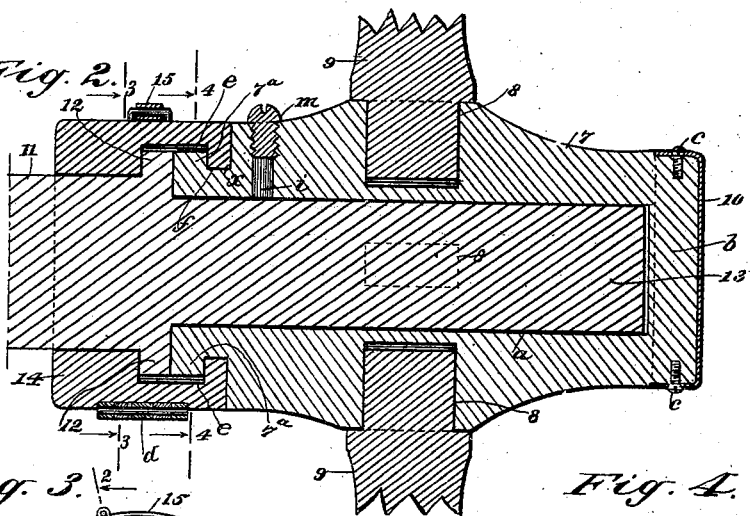
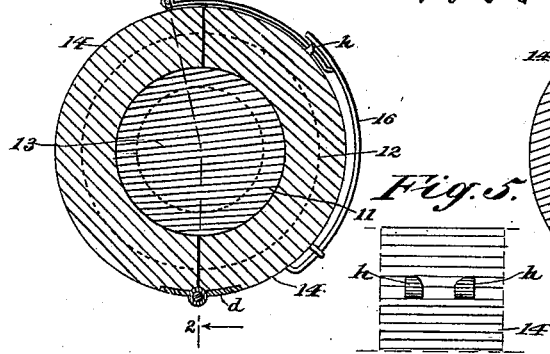
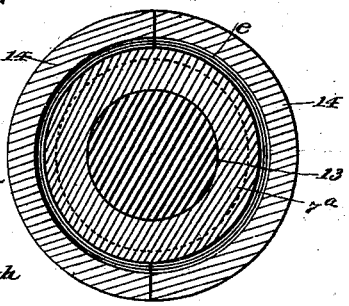
WITNESSES:
Wm L. Patton
D. W. Hanaford
INVENTOR
Edwin B. Jones.
BY
ATTORNEYS

UNITED STATES PATENT OFFICE.

EDWIN B. JONES, OF HORNELLSVILLE, NEW YORK.

VEHICLE-HUB.

SPECIFICATION forming part of Letters Patent No. 665,101, dated January 1, 1901.

Application filed September 12, 1900. Serial No. 29,829. (No model.)

*To all whom it may concern:*

Be it known that I, EDWIN B. JONES, a citizen of the United States, and a resident of Hornellsville, in the county of Steuben and State of New York, have invented a new and Improved Vehicle-Hub, of which the following is a full, clear, and exact description.

This invention relates to the hubs of wheels for vehicles, and has for its object to provide a novel simple device which will dispense with the use of a spindle bur or nut at the free end of the spindle, be well adapted to detachably hold the vehicle-hub upon the spindle of the vehicle-axle, render the connection of parts dust-proof, prevent improper escape of lubricant, and afford a more simple, convenient, and reliable means for holding the hub of a vehicle-wheel upon the axle-spindle than has heretofore been employed.

The invention consists in the novel construction and combination of parts, as is hereinafter described, and defined in the appended claim.

Reference is to be had to the accompanying drawings, forming a part of this specification, in which similar characters of reference indicate corresponding parts in all the figures.

Figure 1 is a side view of the improved wheel-hub. Fig. 2 is a longitudinal sectional view substantially on the line 2 2 in Fig. 3. Fig. 3 is a transverse sectional view substantially on the line 3 3 in Fig. 2. Fig. 4 is a transverse sectional view, substantially on the line 4 4 in Fig 2. Fig. 5 is an enlarged fragmentary side view of a box-like keeper-collar employed and of details thereon and Fig. 6 is a detached and enlarged plan view of a latch-plate, which is a feature of the invention.

The hub 7 may be formed peripherally as shown, or the design and proportion of the same may be changed if desired, and it may be constructed of wood or metal. As represented, the body of the hub 7 is of increased diameter intermediately of its ends, and this portion of the hub is cylindrical, having a series of spaced mortises or sockets 8 formed radially therein for the reception of the spokes 9, as indicated in Fig. 2.

Extending in each direction from the cylindrical portion of the hub 7 are end portions of suitable length, and these parts of the hub may be rendered coniform, as shown in Figs. 1 and 2, to give the hub conventional shape. A circumferential flange $7^a$ is formed on the inner end of the hub 7 by cutting an annular channel $x$ near said end, and the external diameter of the circular flange $7^a$ is somewhat less than the diameter of said end of the hub.

The hub 7 is axially bored to provide a spindle-receiving socket $a$ therein, and said socket extends centrally in the hub from its rear end to a point near the front end, leaving a solid wall $b$ at the front end, and the latter is preferably incased by a cupped band 10, held in place by screws $c$ or their equivalents.

The axle-body 11 is provided with a circumferential flange 12 where the axle-body and the spindle 13 join, and, as represented in Fig. 2, the true adjacent sides of the flanges $7^a$ and 12 have loose contact when the spindle is fully inserted in the socket $a$.

A keeper-collar 14 is an important feature of the invention and, as shown, comprises a bisected annular box, the two half-sections of which are hinged together at adjacent edges, as shown at $d$ in Fig. 3. The two-part collar or box 14 is longitudinally and axially bored throughout its length, the bore at one end loosely embracing the cylindrical body of the axle 11 when the parts of the device are assembled for service. The bore of the keeper collar or box 14 is suitably increased in diameter for a portion of its length from the opposite end thereof, and at a short distance from the end wall of the box, which has been counterbored, as explained, an annular recess $e$ is formed in the bore of the collar. The groove or recess $e$ is of such dimensions as will adapt it to receive the two flanges $7^a$ and 12 when the collar is adjusted upon the axle 11, and it will be seen in Fig. 2 that this recess leaves an inwardly-extending circular flange $f$ at the end of the collar which is adjacent to the recess. The flange $f$ is fitted into the circumferential channel $x$, and it will be apparent that when the bisected collar or box 14 is placed upon the hub and axle after the spindle 13 is fully inserted in the socket $a$ the flange $f$, by its close engagement within the channel $x$, will serve to hold the spindle in the hub 7, owing to the location of the radial flanges 7ª and 12 within the recess e, as clearly shown in Fig. 2.

The preferred means for retaining the two hinged half-sections of the box or collar 14 closed upon the axle 11 and hub 7, and thus retaining the latter in running connection with the spindle 13, consists of the following details of construction: A latch plate or bar 15 is provided of suitable length, and at one of its ends said plate is hinged upon the surface of one half-section of the bisected collar 14. The latch-plate is bent to adapt it to conform to the curvature of the collar 14, and when imposed thereon overlaps the joint between the collar-sections, opposite the joint between the hinged edges thereof, as shown in Figs. 1 and 3. Two opposite notches g are formed in the side edges of the latch-plate 15, near the free end thereof, and upon the exterior surface of the collar-section which the latch-plate is to connect to the one upon which it is hinged two spaced stud-like projections h are positioned and are adapted to pass into the notches g and latch fast upon locking-shoulders g' at the edges of the notches.

It will be seen that when the two-part keeper-collar 14 is loosely secured upon the axle and hub by means of the latching device which has been described the hub will be held to rotate freely upon the axle-body 11 and spindle 13, and as the joints between these parts may be sufficiently close to prevent any rattling or wabbling of the hub upon the spindle and axle it is obvious that the improvement provides a very simple and efficient novel means for connecting the hub with the spindle and axle.

To prevent an accidental detachment of the latch-plate 15 from the studs h, a spring-detent 16 is preferably employed, consisting of an elongated wire loop held by one end upon a half-section of the keeper-collar 14, so as to extend toward the free end of the latch plate or bar and rest thereon with sufficient pressure to prevent the latch-plate from releasing its hooked connection with the studs h until the detent is manipulated to remove it from over the latch-bar, its lateral resilience permitting such manipulation when it is necessary to remove the keeper-collar from the axle and hub.

A passage i for the introduction of a lubricant may be formed either in the hub 7 or keeper-collar 14, and this orifice may be closed by a screw m or by any other available means.

As it is only necessary to remove the keeper-collar or box 14 to release the hub 7 from the axle 11, and as this may be effected in a moment, it will be apparent that time and labor are saved by the employment of the improvement.

It will be seen from the peculiarly-advantageous construction of the improvement that but a small amount of lubricant can escape if the joints between the half-sections of the keeper-collar are as close as they should be, and dust will be excluded from the surface of the spindle 13.

As there is no screw connection between the outer end of the axle-spindle 13 and the outer end of the hub 7, as is usual, it will be seen that lubricant cannot escape at the outer end of the hub, and the provision of the cupped band 10 affords a neat finish for the outer end of the hub.

The improvement dispenses with the ordinary spindle bur or nut and renders the accidental removal of a vehicle-wheel impossible, thus avoiding serious accidents to occupants of the conveyance due to the loss of spindle-nuts from the vehicle when it is in rapid motion or the breaking of an axle on a draft-wagon from a like cause.

Having thus described my invention, I claim as new and desire to secure by Letters Patent—

The combination with the axle having a spindle and a circumferential flange at the inner end of the spindle, the hub fitted over the spindle and having at its inner end a flange arranged to abut against that of the axle, and a peripheral groove adjacent thereto, a two-part collar having a portion in engagement with the axle, an end flange fitted into the groove of the hub, and an intermediate portion recessed on its inner face for the reception of the flanges on the axle and on the hub respectively, a latch-bar hinged to one part of the collar, projections located upon the other part of the collar and arranged for locking engagement with said latch-bar, and a spring-detent secured to the same part of the collar which carries the said projections, said detent extending over the end of the latch-bar to assist in holding the same.

In testimony whereof I have signed my name to this specification in the presence of two subscribing witnesses.

EDWIN B. JONES.

Witnesses:
MILO M. ACKER,
NELLIE L. HENRY.